United States Patent Office 3,492,202
Patented Jan. 27, 1970

3,492,202
PROCESS FOR THE PRODUCTION OF β-CAROTENE
Robert C. Bohinski, South Euclid, Ohio, assignor to Chas. Pfizer & Co., Inc., New York, N.Y., a corporation of Delaware
No Drawing. Filed Dec. 12, 1967, Ser. No. 689,772
Int. Cl. C12b 1/00
U.S. Cl. 195—28                                    3 Claims

ABSTRACT OF THE DISCLOSURE

A method for improving the yields of β-carotene produced by the aerobic cultivation of *Blakeslea trispora* in aqueous nutrient media containing naturally occurring fats or oils, in which all or part of the oil or fat it replaced by a soapstock obtained from the purification of a naturally occurring fat or oil.

BACKGROUND OF THE INVENTION

This invention relates to an improved cultivation process for the production of β-carotene. In particular this invention relates to an improved cultivation process for the production of β-carotene which comprises the inclusion of a soapstock in the cultivation medium.

β-Carotene occurs naturally in the green portions of plants where it is associated with the chlorophylls and xanthophylls. It is a precursor for vitamine A, being oxidized in the liver to this vitamin, which is essential for animal and human health. Because of its importance, β-carotene finds extensive use as an additive to animal foods. when added to poultry feeds; it has the additional advantages of improving the pigmentation of the egg yolk, as well as certain poultry tissues.

Previously, β-carotene and the relates carotenoids were obtained from plants by extraction. While β-carotene itself has also been prepared synthetically, considerable interest has been shown in producing it by cultivating microorganisms belonging to the order Mucorales, in particular with strains of *Blakeslea trispora* in various nutrient media.

These cultivations are generally carried out aerobically, using media containing assimilable carbon and nitrogen sources, thiamine, wetting agents, and β-ionine or a suitable substitute thereof. It has also been shown that the presence of a rapid material in the medium, such as naturally occurring fat or oil, e.g., cottonseed oil, soybean oil, at concentrations of from about 1 to 8%, leads to improved yields. On the other hand, use of these relatively expensive oils increases the cost of producing β-carotene.

We have now found that these oils can be replaced satisfactorily, either partially or entirely, with the cheaper soapstocks, which are obtained in the purification of these naturally occurring animal, fish, and vegetable oils. Not only have we discovered that these oils can be replaced with the corresponding soapstocks, but we have also found that such a replacement leads to improved yields of β-carotene.

Thus, the present invention provides an inexpensive and improved method for producing β-carotene by the aerobic cultivation in aqueous nutrient media of β-carotene-producing strains of *Blakeslea trispora*.

SUMMARY OF THE INVENTION

This invention comprises an improved process for producing β-carotene which comprises aerobically cultivating a β-carotene-producing strain of *Blakeslea trispora* in an aqueous nutrient medium containing a soapstock.

In particular, this invention describes an improved process of producing β-carotene which comprises aerobically cultivating a β-carotene-producing strain of *Blakeslea trispora* in an aqueous nutrient media that contains a soapstock derived from the purification of an animal, fish, or vegetable oil.

This invention specifically provides for an improved process of producing β-carotene by aerobically cultivating a β-carotene-producing strain of *Blakeslea trispora* in an aqueous nutrient media containing a soapstock derived from the purification of a soybean oil.

This invention further describes an improved process of producing β-carotene comprising the aerobic cultivation of a β-carotene-producing strain of *Blakeslea trispora* in an aqueous nutrient media that contains a soapstock derived from the purification of a fish oil.

DETAILED DESCRIPTION OF THE INVENTION

The improved process of the instant invention for the production of β-carotene involves the aerobic cultivation of a β-carotene-producing algae in an aqueous nutrient medium that contains an assimilable source of nitrogen and carbon, a thiamine source, essential minerals, and a soapstock derived from an animal, fish, or vegetable oil.

Appropriate amounts of a kerosene, such as "Deobase," and citrus molasses, an inexpensive substitute for β-ionone are also usually included in the medium. Both of these additives are described in U.S. Patents 3,025,221 and 3,079,380. To prevent clumping of the algae we generally include a surfactant in the medium.

We have found corn meal and Pharmamedia to be a convenient source of assimilable carbon and nitrogen. This latter product is a cottonseed-derived protein material obtainable from the Traders Protein Division of Traders Oil Mill Company, P.O. Box 1837, Fort Worth 1, Tex.

A preferred method of preparing a viable slant is to separately propagate in absolute darkness the (+) and (−) mating cells of *Blakeslea trispora* on a medium composed of potato dextrose agar (available from the Difco Laboratories, 920 Henry St., Detroit, Mich. 48201), thiamine, and asparagine, at 22–25° C. for about 6 days. Then inoculum medium is prepared from Pharmamedia, corn meal, and thiomine hydrochloride. The pH is adjusted to about 6.5 and the medium is then carefully sterilized, preferably by heating it in a steam autoclave. Slants of (+) and (−) *Blakeslea trispora* are areobically propagated on this sterilized medium for about 48 hours in the dark. The resultant inoculation broth is then used to inoculate the sterilized cultivation media.

Generally, the propagation is conducted for about 5 days. The temperature can be varied from about 20–37° C., with the optimum temperature being about 28° C. The cultivation can be performed in the presence as well as in the absence of light, and the pH of the medium can be varied anywhere from about 5.5 to 8.0, with the optimum range being about 6.5–7.5. The cultivations are conducted under an air atmosphere, with sufficient agitation to ensure effective aeration of the medium, and are allowed to proceed for about 4 to 7 days.

As previously mentioned, in the past the inclusion of vegetable and animal oils in the medium was found to increase markedly the yields of β-carotene obtained. Thus, such oils as soybean oil, cottonseed oil, olive oil, peanut oil, or other vegetable glycerides are added to the medium, generally in amounts of up to 8% by weight. Although the yield of β-carotene is found to increase when such oils were included in the media, the advantages obtained are partly offset by the relatively high cost of these oils. Consequently, such processes are not feasible for the commercial production of β-carotene.

We have now found that these vegetable and animal oils can be replaced with the respective cheaper and more readily available soapstocks. It appears that not only can such oils be replaced by their respective soapstocks, but furthermore we have surprisingly found that upon doing so the yields of β-carotene are actually improved.

Soapstocks are the alkaline, gel-like, insoluble by-products obtained when vegetable, fish, and animal oils are refined by treatment with alkali. They contain mono-, di-, and triglycerides, some oil, and insoluble matter. We have used soapstocks obtained from the purification of vegetable, fish and animal oils in practicing our invention. An example of a vegetable soapstock which has been successfully used is that derived from soybean oil, i.e., soybean soapstock. This latter product is available from the Colfax Shortening Company, 34 Colfax St., Pawtucket, R.I.

We have also found that a fish oil-derived soapstock, obtainable from the Viobin Corp., Monticello, Ill., also gives improved yields of β-carotene when added to the medium.

Generally we prefer to add about 30 to 75 g. of soapstock per liter of medium, with the optimum amount being about 50 g. per liter. As an example of the improved yields of β-carotene obtained in the present process. we have found that a medium containing 50 ml. of cottonseed oil (about 46 g.) per liter of medium will provide only about 49 mg. of β-carotene per 100 ml. of medium; while under the same conditions, a medium containing 50 g. of soybean soapstock per liter of medium yields about 70 mg. of β-carotene per 100 ml. In general, we have found that replacing a vegetable, fish, or animal oil with an equivalent amount of the cheaper soapstock generally gives about 40–60% more β-carotene.

A further advantage of using soapstock is that this crude, cheap by-product need not be pretreated or purified prior to use, but may be used directly in the state in which it is obtained from the purification of the corresponding animal, fish and vegetable oil.

In the recent U.S. Patent 3,128,236, issued to J. E. Zajic, it is reported that in many cases higher yields of β-carotene are obtained when unequal proportions of the (+) and (−) strains of *Blakeslea trispora* are added to the cultivation medium.

We have also found this to be true in practicing our invention. Thus, when the proportion of (−) *Blakeslea trispora* NRRL 2896 is greater than (+) *Blakeslea trispora* NRRL 2895 in the medium, there is a considerable improvement in the yield of β-carotene.

The following examples are given by way of illustrating the invention, but are not to be construed as limiting the scope thereof.

Preparation of the inocula

The inocula are prepared by aerobically propagating slants of *Blakeslea trispora* on the following medium:

Pharmamedia[1] _____ g__ 50
Corn meal _____ g__ 25
Thiamine HCl (solution containing 200 mg./ 100 ml.) _____ ml__ 1
Tap water, q.s. ad _____ ml__ 1000

[1] Pharmamedia is a cottonseed-derived protein material available in the form of a yellow, finely ground powder. It is obtained from the Traders Protein Division of the Traders Oil Mill Company, P.O. Box 1837, Fort Worth 1, Tex. It is comprised essentially of globular protein obtained from the embryo of the cottonseed, with the protein content varying from about 55 to 60%, depending upon the grade of cottonseed used in its preparation.

After the inoculation medium is prepared as described above, the pH is adjusted to 6.5 with 10 N NaOH. A series of 500 ml. Erlenmeyer flasks are each filled with 150 ml. of the medium and sterilized by autoclaving them in a steam atmosphere for 45 minutes at 20 p.s.i. (+) *Blakeslea trispora*, NRRL 2895 are transferred to one series of flasks containing the above media and (−) *Blakeslea trispora* NRRL 2896 to another series. After propagating these microorganisms for 48 hours at 25–28° C. in the dark with shaking, portions of the inocula broth are added to the fermentation media described below. The pH of the inocula broth at the end of the 48 hour period is usually about 6.2.

Example 1.—The cultivation media are all prepared with the following basic components:

Pharmamedia _____ g__ 50
Corn meal _____ g__ 25
(Diobase, Sonneborn and Sons, trademark for deodorized kerosene) _____ ml__ 50
Triton X–100, Rohm and Haas trademark for octyl phenoxy decaethoxy ethanol _____ ml__ 1.2
Thiamine HCl solution 200 mg./ml. _____ ml__ 1
KH$_2$PO$_4$ _____ g__ 0.5
Citrus molasses _____ ml__ 50

Other constituents may be added to those listed above, and all the components are dissolved in a sufficient amount of tap water to give a total volume of 1000 ml. The pH of the resulting medium is adjusted to 6.5 with 10 N NaOH. Prior to inoculation the media are sterilized in an autoclave for 40 minutes at a steam pressure of 20 p.s.i.

Media A to E are prepared by adding the indicated amounts of the supplemental additives below and the basic ingredients described above to water and adjusting the total volume to one liter.

Medium A.—This medium is prepared from 50 ml. of refined cottonseed oil and the basic ingredients above.

Media B to E.—A 10% by weight soybean soapstock suspension is prepared by mixing 100 g. of the soapstock with 900 g. of water in a blender.

The soybean soapstock can be obtained from the Colfax Company, 34 Colfax St., Pawtucket, R.I. It is a pale, straw-yellow, gel-like by-product obtained as the crude alkaline wash in the purification of soybean oil and contains considerable amounts of mono-, di-, and triglycerides.

A typical analysis is given below:

| | Percent |
|---|---|
| Solids | 74.5 |
| Ash | 10.8 |
| Na | 3.7 |
| Carbon | 47.2 |
| Hydrogen | 9.77 |
| Nitrogen | 0.54 |
| Total carbohydrate | 4.4 |

Media B to E below are prepared, as described above, with the indicated amounts of this soapstock solution.

Medium B.—100 ml. of soapstock solution.
Medium C.—300 ml. of soapstock solution.
Medium D.—500 ml. of soapstock solution.
Medium E.—750 ml. of soapstock solution.

Media M to R.—Media M to R below are prepared by mixing the indicated amounts of refined cottonseed oil with the specified amounts of a standard medium prepared solely from the basic components mentioned at the beginning of this example.

Medium M.—5 ml. cottonseed oil+500 ml. of standard fermentation medium.

Medium N.—15 ml. cottonseed oil+500 ml. of standard fermentation medium.

Medium O.—25 ml. cottonseed oil+500 ml. of standard fermentation medium.

Medium P.—37.5 ml. cottonseed oil+500 ml. of standard fermentation medium.

Medium Q.—5 ml. of cottonseed oil, previously sterilized by autoclaving in a steam atmosphere+95 ml. of the standard medium.

Medium R.—5 ml. of the cottonseed oil, previously sterilized by filtration through a Millipore Filter+95 ml. of the standard medium.

To a series of 500 ml. Erlenmeyer flasks are added 100 ml. of each of the above media. The flasks are plugged with cotton, sterilized, and cooled. Each flask is then inoculated with 5 ml. of each of the 48 hour inocula of *Blakeslea trispora* NRRL 2895 and NRRL 2896.

The flasks are shaken on a rotary shaker in the dark at 28° C. for 5 days. At the end of this period the pH of the medium is determined. The *Blakeslea trispora* cells are removed and the amount of β-carotene therein estimated spectrophotometrically at 460 mμ, using authentic β-carotene as a standard. The results are given in Table I.

TABLE I

| Flask | Medium | Additives | pH of the medium | Conc. of β-carotene, mg./100 ml. |
|---|---|---|---|---|
| 1 | A | 50 ml. of cottonseed oil per liter of medium. | 6.95 | 41 |
| 2 | B | 10 g. soybean soapstock per liter of medium. | 8.0 | 29 |
| 3 | C | 30 g. soybean soapstock per liter of medium. | 7.75 | 55 |
| 4 | D | 50 g. soybean soapstock per liter of medium. | 7.6 | 72 |
| 5 | E | 75 g. soybean soapstock per liter of medium. | 7.3 | 57 |
| 6 | M | 5 ml. cottonseed oil+500 ml. of standard medium. | 7.9 | 33 |
| 7 | N | 15 ml. cottonseed oil+500 ml. of standard medium. | 7.7 | 46 |
| 8 | O | 25 ml. cottonseed oil+500 ml. of standard medium. | 7.1 | 52 |
| 9 | P | 37.5 ml. cottonseed oil+500 ml. of standard medium. | 6.75 | 46 |
| 10 | Q | 5 ml. sterilized cottonseed oil+95 ml. of standard medium. | 6.4 | 34 |
| 11 | R | 5 ml. sterilized cottonseed oil+95 ml. of standard medium. | 6.4 | 37 |

Example II.—When the cultivation procedure and conditions of Example I is repeated using media containing mixtures of a naturally occurring oil such as cottonseed and soybean oil, and the corresponding soapstock, the yields of β-carotene are enhanced as compared to where the naturally occurring oil is used alone.

Example III.—Substantially the same results are obtained when the procedure of Examples I and II is repeated using an equivalent amount of a fish oil-derived soapstock instead of the soybean soapstock.

Example IV.—Employing Medium D of Example I, cultivations are initiated with varying amounts of (+) and (−) *Blakeslea trispora* inocula, as shown in Table II. The cultivation conditions are identical to those of Example II. The results obtained, which are listed in Table II, show that a larger yield of β-carotene is obtained, when the media are inoculated with a higher proportion of the (−) *Blakeslea trispora* strain; as compared to the (+) strain.

Substantially the same results are obtained when the medium contains a fish oil-derived soapstock.

TABLE II

| Flask | Ml. of inoculum of (+) Blakeslea trispora NRRL 2895 | Ml. of inoculum of (−) Blakeslea trispora NRRL 2896 | pH | Conc. of β-carotene, mg./100 ml. |
|---|---|---|---|---|
| 12 | 10 | 0 | 7.0 | 2.40 |
| 13 | 0 | 10 | 7.45 | 2.80 |
| 14 | 7 | 3 | 7.5 | 62 |
| 15 | 3 | 7 | 7.1 | 85 |
| 16 | 6 | 4 | 7.5 | 62 |
| 17 | 4 | 6 | 7.6 | 87 |

What I claim is:

1. In the process for producing β-carotene by cultivating a β-carotene-producing strain of (+) *Blakeslea trispora*, (−) *Blakeslea trispora*, and mixtures thereof in an aqueous nutrient medium in the presence of between 1 and 8% by weight/volume of a naturally occurring fat or oil, the improvement which comprises replacing all or an effective part of said fat or oil by an effective amount of naturally occurring fat or oil soapstock.

2. The process of claim 1 wherein said soapstock is soybean soapstock.

3. The process of claim 1 wherein said soapstock is fish soapstock.

References Cited

UNITED STATES PATENTS 2,890,989   6/1959   Anderson _____ 195—28 X

ALVIN E. TANENHOLTZ, Primary Examiner